Durand & Gilbert,
Fruit Knife.

No. 106,473.      Patented Aug. 16. 1870.

Witnesses.
A. J. Tibbits
J. H. Shumway

Fred Durand & Wm. F. Gilbert
Inventors
By their Attorney
John E. Earle

United States Patent Office.

FRED. DURAND AND WILLIAM F. GILBERT, OF DERBY, CONNECTICUT.

Letters Patent No. 106,473, dated August 16, 1870.

IMPROVEMENT IN VEGETABLE-KNIVES.

The Schedule referred to in these Letters Patent and making part of the same

*To all whom it may concern:*

Be it known that we, FRED. DURAND and WILLIAM F. GILBERT, of Derby, in the county of New Haven and State of Connecticut, have invented a new Improvement in Vegetable-Knife; and we do hereby declare the following, when taken in connection with the accompanying drawings and the letters of reference marked thereon, to be a full, clear, and exact description of the same, and which said drawings constitute part of this specification, and represent in—

Figure 1:
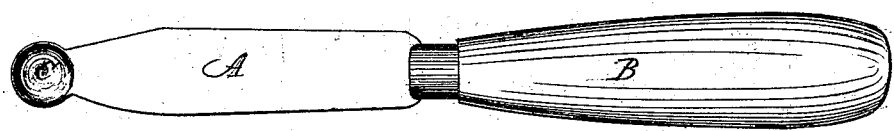

Figure 1 a top view, and in

Figure 2:
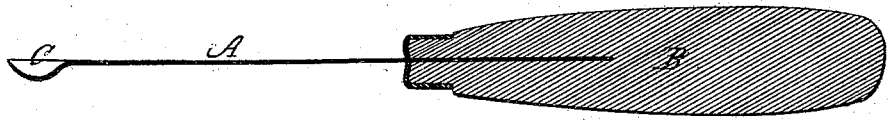

Figure 2, a central section.

This invention relates to an improvement in knives for paring vegetables, the object being greater facility for cutting out defective parts; and It consists in forming in the end of the blade a small scoop-shaped cutter, by means of which the eyes of potatoes and other defects in vegetables may be easily removed.

A is the blade, formed from suitable metal, fitted to a handle, B, the end or point of the blade terminating in a circular scoop-shaped end, C, as seen in the accompanying drawings, the edge of the scoop being brought to an edge, so as to readily cut the vegetables.

The blade of the knife is used for paring vegetables in the usual manner, and the end, formed as described, affords a ready instrument for removing the defective portions.

We claim as our invention—

As an article of manufacture, the knife-blade A, provided with the scoop-shaped end C, substantially in the manner herein set forth.

FRED. DURAND.
WM. F. GILBERT.

Witnesses:
T. G. BIRDSEY,
JOSEPH TOMLINSON.